Figure 4:
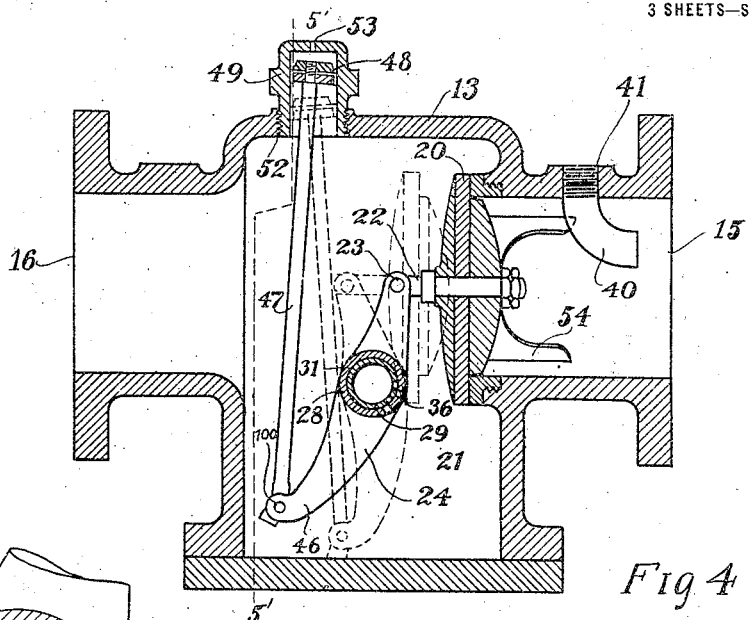

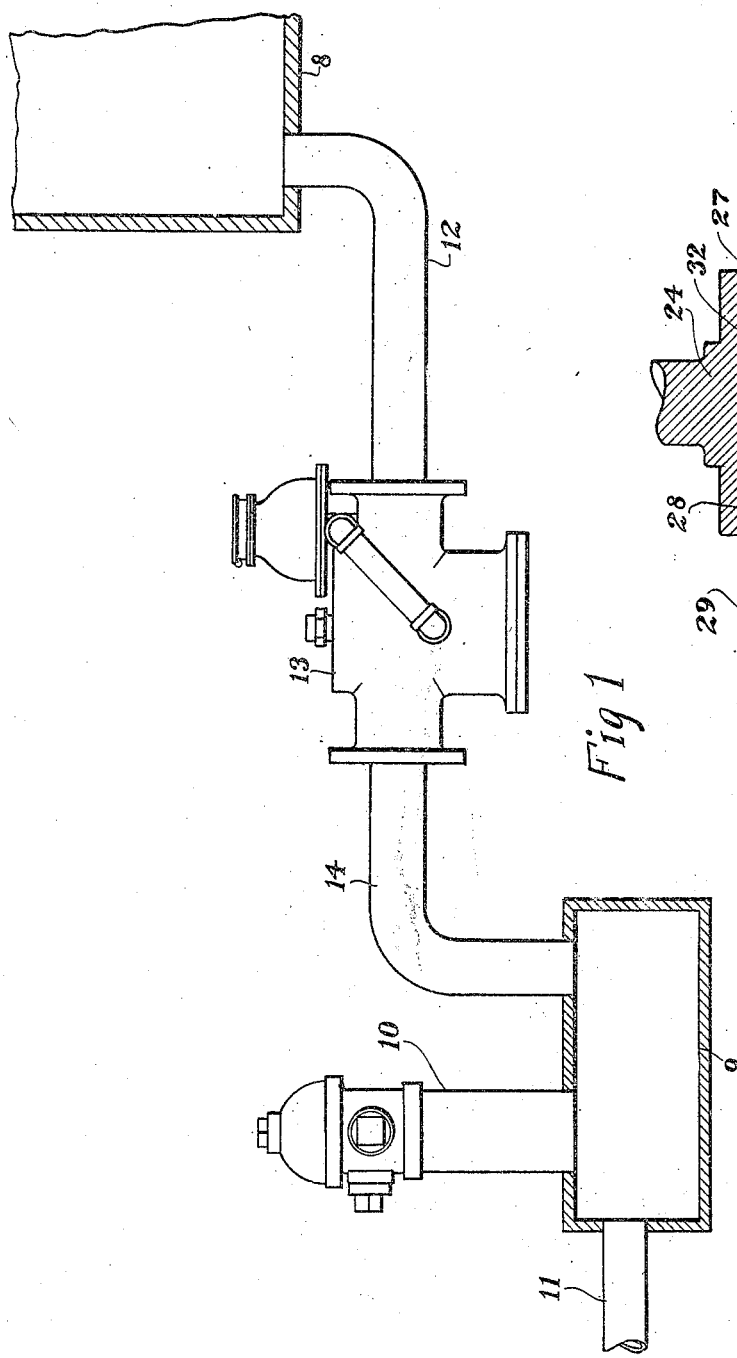
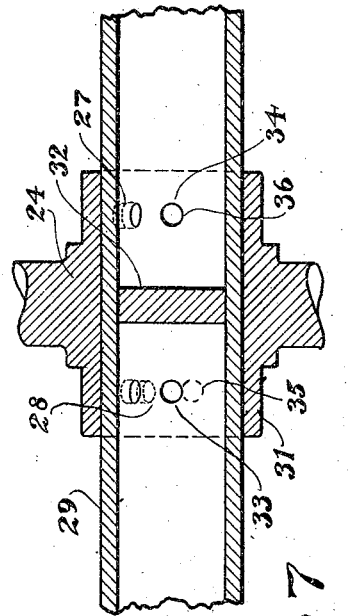

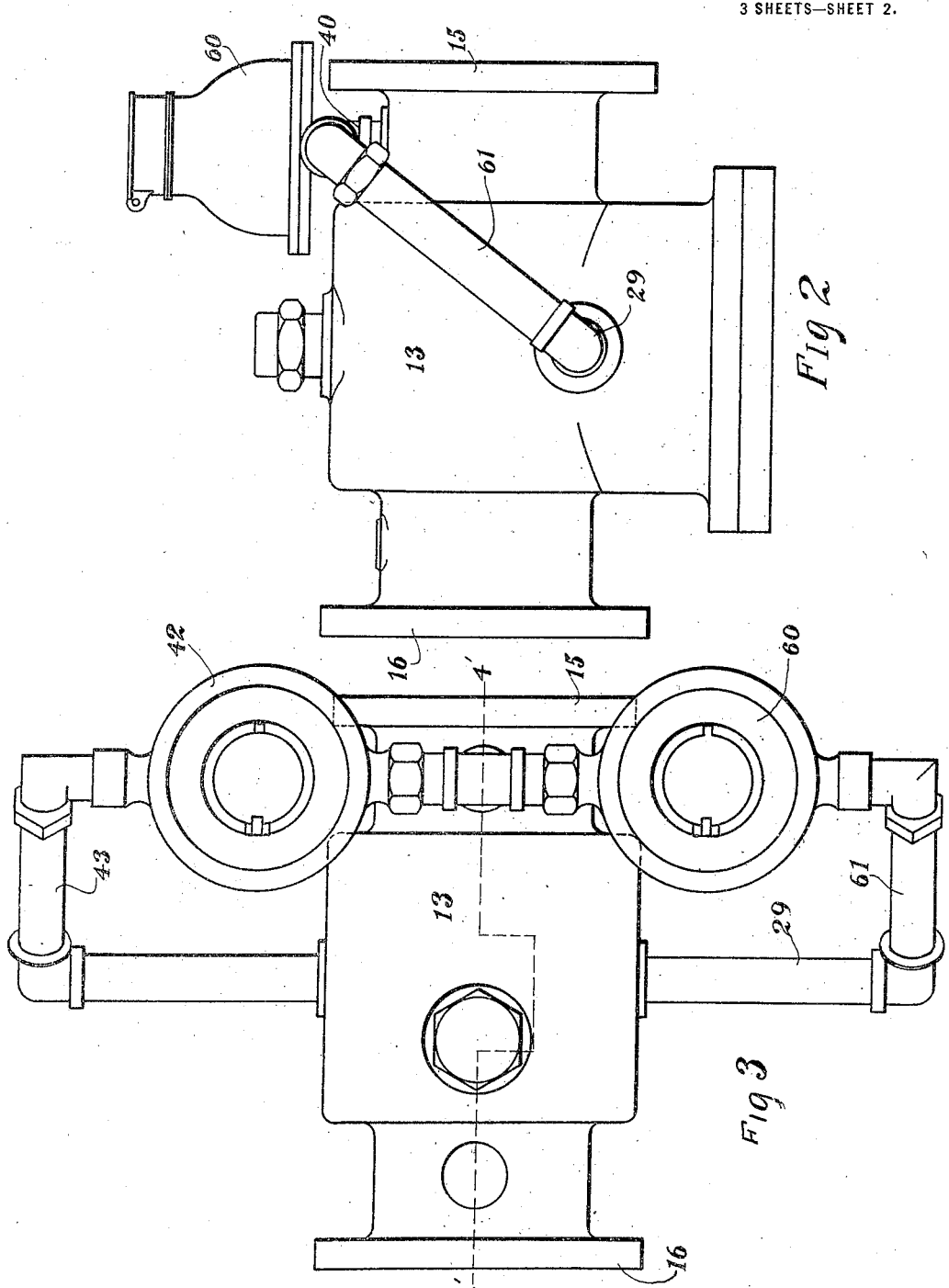

G. G. EARL & A. B. WOOD.
FLUID METERING SYSTEM.
APPLICATION FILED JULY 12, 1911.

1,212,149.

Patented Jan. 9, 1917.
3 SHEETS—SHEET 3.

Witnesses

Inventors
Albert B. Wood — George G. Earl
By F. O. Richey
Their Attorney

UNITED STATES PATENT OFFICE.

GEORGE GOODELL EARL AND ALBERT BALDWIN WOOD, OF NEW ORLEANS, LOUISIANA.

FLUID-METERING SYSTEM.

1,212,149.              Specification of Letters Patent.         Patented Jan. 9, 1917.

Application filed July 12, 1911. Serial No. 638,047.

*To all whom it may concern:*

Be it known that we, GEORGE G. EARL and ALBERT B. WOOD, both citizens of the United States, both residing at New Orleans, in the parish of Orleans and State of Louisiana, have invented certain new and useful Improvements in Fluid-Metering Systems; and we do hereby declare the following to be a full, clear, and exact description of our invention, such as will enable others skilled in the art to which it appertains to make and use the same.

One of the objects of our invention is the production of mechanism for the accurate measurement of the flow of fluids through fluid ducts or mains, our more particular aim being to provide such a mechanism adapted for use in mains through which the normal flow is not so great as the abnormal flow. For example, in mains where water is supplied to a manufacturing establishment the normal flow may be small compared to that which is required during a fire or when an abnormal usage may be demanded. The normal flow may be measured by a direct reading meter, that is, one which measures all the water flowing through the main. When an abnormally large quantity of water is required, however, it is usually impractical to measure the flow with a direct reading meter, owing to the cost of large meters of this type. A proportional meter, that is, one operated by a proportion of the flow and registering the entire flow, if combined with a direct reading meter to measure small flows, may, under such conditions, be of value. The device of our invention also accurately measures the flow when the mechanism is changing from the condition under which the normal flow passes to the condition under which the abnormal flow is to be passed. It is necessary to change the condition of the mechanism when it is desired that the abnormal flow should pass.

Another object of our invention is the production of the device which when being changed from the condition permitting the normal flow to that permitting the abnormal the tendency of the system to persist in its normal condition is reduced as it approaches the ultimate position in which the greatest abnormal flow occurs. Thus we may, as we do in the form of our invention illustrated and described in this specification, obstruct the flow through the main by means of a valve held in place by a couple, whose effort to keep the valve closed is reduced as the valve opens with the result that the farther the valve is from a closed position, the less effective power will be exerted upon it by the couple.

Still another object of our invention is to reverse this condition of affairs when the system is being restored to normal by increasing the effort to restore the system to normal, as it deviates from the abnormal position and approaches normal. Thus, in the particular form shown, the couple increases as the valve approaches the closed position.

Still another object of our invention is the provision of means to control the flow in the main through the pressure in the main. Thus we aim to utilize the pressure of the fluid in the main, which is a variable quantity, in the control of our device.

Other objects of our invention and the invention itself will be best understood by reference to the following description when taken in connection with the accompanying illustration, showing one specific embodiment of our invention, while the scope will be more particularly pointed out in the appended claims.

Figure 6:
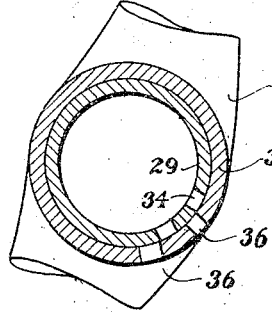
Figure 5:
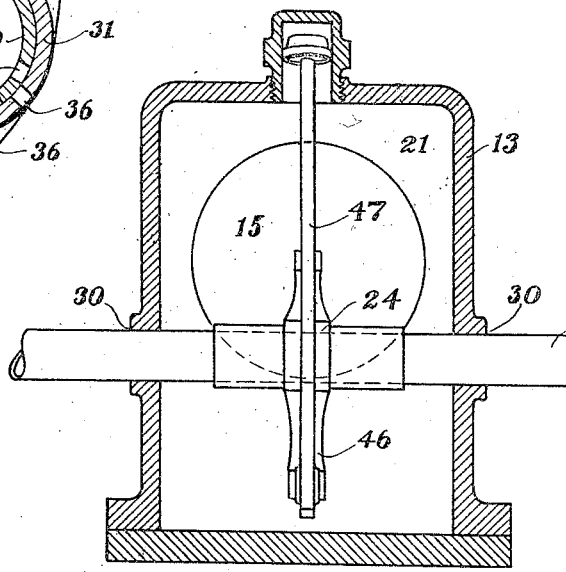

Figure 1 shows a diagram of a system with which our invention may be employed. Fig. 2 is a side elevation of the apparatus to which our invention is applied. Fig. 3 is a plan view of the apparatus shown in Fig. 2. Fig. 4 is a cross section taken through the line 4'—4' of Fig. 3. Fig. 5 is a section taken through the line 5'—5' of Fig. 4. Figs. 6 and 7 are details of the apparatus shown in the other figures.

Referring now to the drawings and to the form of our invention shown therein, we show a source of fluid pressure, such as a reservoir at 8. A second source of pressure, which may be a source of negative pressure is shown at 9. This may be a fire plug, such as is shown at 10 or a supply pipe, such as is shown at 11. These two sources of pressure are connected by a fluid duct or main 12, which passes through a box 13, in which a fluid controlling device is housed. The duct or main 12 is continued at 14 to the source 9. The box 13 is provided with an entrance 15 into which the main 12 enters and an exit opening 16 connected with the main 14. In systems of this kind, especially when used for supplying water to town or manufacturing establishments, the normal flow is considerably less than that which is required on extraordinary occasions, such as for example, fires. The metering systems now in use may be ample to measure the normal flow, but it is desired to provide other means for measuring the abnormal flow during the extraordinary or abnormal conditions.

In the form of our invention shown, the path of the water is obstructed, preferably by a valve, such as is shown at 20. This valve may be mounted in the chamber 21 inside the box at the mouth of the exit 15. This valve is mounted to reciprocate inside the chamber, being pivotally connected by a link 22 and a pivot joint 23 to a lever 24, which is itself pivoted inside the chamber. The valve 20 controls a pair of fluid controlling devices such as valves 27 and 28 preferably rotary valves, one of which is opened when the other is closed and each of which is being opened when the other is being closed. A duct 29 passes through the chamber 21 and the walls thereof at 30—30. A hollow sleeve 31 fastened to the lever 24 is mounted over this duct and rotates with said lever. The interior of the duct 29 is divided by a partition 32. On one side of this partition the walls of the duct are pierced with an opening or a plurality of openings 33 and on the other side a plurality of openings 34. The sleeve 31 is likewise pierced with openings 35 on one side of the partition and 36 upon the other. This structure, including the duct, the sleeve, and the opening therein, is known as a Corliss type valve, and is preferred by us, though we do not wish to be limited thereto. The two sets of openings are so arranged that they correspond, the set 33—35 being entirely open when the valve 20 is closed and the flow is normal and the set 34—36 being entirely open when the valve is entirely open. The main 15 is tapped by a duct 40 at an orifice 41 above the position of the valve 20. The fluid flowing therefrom under normal conditions passes to a direct reading meter 42 through a duct 43 into the duct 29 and through the openings 33 and 35 on to the second source of pressure, it being prevented from passing back by the partition 32. This flow is measured and if desired, registered by the meter 42. The other end 46 of the lever 24 is pivoted to an arm 47 which is connected to a pressure device, such as the piston 48 working in a piston box 49, preferably connected in an orifice 52 in the walls of the chamber 21 and communicating therewith so that the pressure in this chamber may be directed against the piston and operate the same as a dash pot. An air hole 53 is formed in the top wall of this piston chamber. Guides 54 are provided for the valve 20 to prevent it swinging from the direct line of its proper movement when opened and closed. It will be seen that the influence exerted upon the valve by the pressure member 48 assuming the pressure on both sides of the member 48 to be constant at any one time is exerted through a couple which consists of the force or pressure against the member 48 and a lever arm equal to the distance between the line of that pressure and the center of the axis of rotation. It will also be seen that as the valve opens, this couple decreases in effective power, owing to the fact that the point of connection between the member 48 and the lever arm 24 is drawn horizontally in toward the axis. As the valve closes, this couple increases, as then the point of connection between 47 and 24 is being moved horizontally away from the axis. A proportional reading meter is shown at 60 connected at one side to the main through the duct 40 and at the other side through a duct 61 to the duct 29 and the valve 34—36, and thence to the chamber 21. As explained, the valve 34—36 will be normally closed.

Should the source of pressure at 9 become disproportionally less than at 12, that is, should there be a demand for a supply of water greater than normal at this point so as to create a pressure below normal in the main 14 and the chamber 21, the pressure upon 48 will be reduced, which will permit the valve 20 to begin to open, said valve being held in position by the pressure member 48 through the couple which has been explained. As the valve 20 begins to open, the controller 33—35 begins to close and the controller 34—36 to open. The amount of opening of the latter is proportional to the distance the valve is from its seat, so that the water which flows through the proportional meter and the duct 61 out through the controller 34—36, will be exactly proportional to that which flows through the main valve 20. The meter 42 will register all the water which flows through the fluid controller 33—35, while the amount flowing through the meter 60 will be measured, as the entire quantity flowing through the valve 20 and the duct 61. As the water flows into the chamber 21 the piston pressure therein will be increased so that the force on the pressure member 48 will be greater. This would tend to check the opening of the valve 20, were it not for the fact that the arm through which the couple acts has been reduced by the opening of the valve 20 and the movement of the point 100 horizontally in toward the axis of the arm 24, thus partially or entirely compensating for the increase, due to the increase of pressure against the member 48. As a matter of fact in actual practice, this change in leverage will not entirely compensate for this increase, but as the fluid flows into the chamber 21, the pressure therein will be increased and the force acting on the device 48 and valve thereby increased, thus checking the opening of the valve 20 and maintaining it in its new position corresponding to the quantity of water flowing in the main and the pressure therein on the two sides of the main valve. As the quantity of water passing continues to increase, this motion will continue until the valve 20 is opened to its full extent shown in dotted line position in Fig. 4.

We prefer to arrange the parts so that the one will exactly compensate for the other and the couple exerted upon the valve will be constant throughout its movement, but our invention is not limited to such an arrangement. This will continue until the valve 20 is opened to its fullest extent, shown in the dotted line position in Fig. 4. When completely open, the controller 33—35 will be entirely closed and the entire flow will be measured by the proportional meter. When the abnormal demand for water at 10 or 11 ceases the pressure backs up in the main 14; the pressure upon the back of the valve 20, tending to close it, and that exerted upon the member 48, would be the same per unit of area. Owing, however, to the shortness of the lever arm of the couple of which the pressure against the member 48 forms an element, the effect exerted by this couple will be at a minimum, so that the valve will start from the dotted line position gradually and will be closed, setting itself firmly in its position and closing the conduit through the proportional meter and opening that through the direct reading meter in a way reverse to that described, the system being thus restored to normal.

While we have shown and described a system employing couples with varying lever arms, we may employ devices in which the lever arms do not vary, since the distance of the valve from its closed position is a function of the pressure differences, and the absolute pressure in the main and proportional to the differences of the fluid pressures and the absolute pressure in the main. We, however, prefer to use the varying lever arms, and have illustrated a device employing such, for the purpose of better illustrating our invention.

It will be understood that we may use any suitable means for producing the couples employed in our invention and that any form of valve or conduit controllers may be employed provided, of course, that these elements are within the scope of the allowed claims. It will also be obvious to those skilled in the art that numerous and extensive departures from the forms and details here shown may be made without departing from the spirit of this invention, the same being shown solely for the purpose of clearly illustrating one specific embodiment thereof.

We claim:

1. In a device of the class described, the combination of a fluid main, a valve in said main adapted to be operated by the fluid in said main, and means to control the operation of said valve, the distance of said valve from its closed position being a function of the pressure differences and the absolute pressure in the main.

2. In a device of the class described, the combination of a fluid main, a valve in said main adapted to be operated by the fluid in said main, and a pressure controlled device controlling the operation of the valve, the distance of said valve from its closed position being a function of the pressure difference and the absolute pressure in the main.

3. In a device of the class described, the combination of a fluid main, a valve in said main adapted to be operated by the fluid in the main, said valve being adapted to be subjected to the pressure of different values on the two sides thereof, a device on one side of said valve operated by the pressure of the fluid on that side of the valve, an arm connecting said device to said valve, said arm and the pressure on said device exerting a moment and means to vary said moment as the valve moves from and toward its closed position.

4. In a device of the class described, the combination of a fluid main, a valve in said main adapted to be operated by the fluid in the main, said valve being adapted to be subjected to pressure of different values on the two sides thereof, a piston on one side of said valve adapted to be controlled by the pressure of the fluid on that side of the valve, and a pivoted lever connecting said piston and said valve, the distance between the valve and the piston being proportional to the distance of the valve from its closed position.

5. In a device of the class described, the combination of a fluid main, a valve in said main adapted to be operated by the fluid in the main, said valve being adapted to be subjected to pressures of different values on the two sides thereof, a piston chamber associated with said main on one side of said valve, a piston in said chamber controlled by the pressure of fluid in said main and adapted to move substantially at right angles to the main, and a pivoted lever arm connecting said piston and said valve, the distance of said valve from its closed position being a function of the pressure difference and the absolute pressure in the main.

6. In a device of the class described, the combination of a fluid main, a valve in said main adapted to bar the flow of fluid in said main when closed, a duct in shunt of said valve, a meter in said duct, a second valve in said shunt controlled by said first named valve to open the second named valve proportionally to the opening of said first named valve whereby the fluid flowing through the shunt is proportional to the fluid flowing through the valve, said first named valve being operated by the fluid in the main and means controlling the operation of said valve, the distance of said valve from its closed position being a function of the pressure differences and the absolute pressure in the main.

7. In a device for the proportional measurement of fluid flow, a fluid main, a main valve therein controlling the flow of fluid therethrough, said valve being operated by the fluid in the main, a path being provided for the fluid around said valve, means controlling said path governed by said main valve, adapted to permit a fluid flow therethrough proportional to the flow through the main valve and means for measuring the fluid flowing through the path.

8. In a device of the class described, the combination of a fluid main, a valve controlling the flow of fluid therein, a path being provided for fluid flow around said valve, a valve of the Corliss type in said path controlled by said main valve whereby the flow of fluid through the path is proportional to the flow through the main and a source of pressure on each side of said main valve.

9. In a device of the class described, the combination of a fluid main, a valve therein controlling the flow of fluid therethrough, a source of pressure on each side of said valve connected to said main, said valve being operated by the pressures from said sources, means for changing the influence of one of said sources of pressure on said valve as said valve approaches or recedes from its closed position, a path for fluid around said valve controlled by said valve, means governed by said valve for controlling said path the flow through said path being proportional to the flow through the valve and means to measure the flow through the path.

10. In a device of the class described, the combination of a fluid main, a valve in said main adapted to be operated by the fluid in the main, said valve adapted to be subjected to pressure of different values on the two sides thereof, a device beyond the valve subject to the changes in pressure in the fluid in that part of the main, an arm connecting said device to said valve, said arm and the pressure on said device forming a moment, and means to vary said moment as the valve moves from and toward its closed position.

11. In a device of the class described, the combination of a fluid main having an orifice therein and associated with a source of fluid pressure, a main valve governed by the pressure in said main and controlling said orifice, a path being provided around said orifice open when said valve is closed, a meter for measuring the fluid flowing through said path, said path being controlled by said main valve and being closed thereby when said main valve is fully opened.

12. In combination, a fluid main having an orifice therein, sources of pressure associated therewith, a main valve in said main between the sources of pressure and controlling said orifice, a plurality of paths being provided around said orifice, meters in said paths and means controlled by said main valve governing the flow through said paths, the flow of fluid through said paths being under the sole control of the main valve.

13. In combination, a fluid main having an orifice therein, sources of pressure associated therewith, a main valve in said main between the sources of pressure and controlling said orifice, a plurality of paths being provided around said orifice, meters in said paths and valves controlled by said main valve governing the flow of fluid through said paths.

14. In combination, a fluid main having an orifice therein, sources of pressure associated with said main, a main valve in said main between the sources of pressure and controlling said orifice, a plurality of paths being provided around said orifice, meters in said paths and means controlled by said main valve governing the flow through said paths, one of said paths being opened by said valve as another is closed.

15. In combination, a fluid main, sources of pressure associated therewith, a main valve in said main between said sources of pressure normally closed, a path being provided for fluid around said valve adapted to conduct the normal flow through said main, a meter for measuring the fluid flowing through said path, said main valve controlling said path to close the same as the main valve opens, a second path being provided around said valve normally closed, said second path being controlled by said main valve and opened thereby in proportion as the main valve opens and a meter for measuring the proportional flow through said second path.

16. In combination, a fluid main, sources of fluid pressure associated with said main, a main valve in said fluid main between two sources of pressure, said valve being normally closed, a path being provided around said valve for conducting the normal flow through said main, a meter in said path for measuring the flow therethrough, a valve governing the said path controlled by said main valve, said valve being closed by said main valve as said main valve opens, a second path being provided around said valve normally closed, a second valve in said second path governing the flow therethrough controlled by said main valve and opened as said main valve is opened, the flow of fluid through said second path being proportional to the flow through the main valve and a proportional meter for measuring the flow through the second path.

17. In combination, a fluid main, sources of fluid pressure associated with said main, a main valve in said fluid main between two sources of pressure, said valve being normally closed, a path being provided around said valve for conducting the normal flow through said main, a meter in said path for measuring the flow of fluid therethrough, a valve governing said path controlled by said main valve, said valve being closed by said main valve as said main valve opens, a second path being provided around said valve normally closed, a second valve in said second path governing the flow therethrough controlled by said main valve and opened as said main valve is opened, the flow of fluid through said second path being proportional to the flow through the main valve, said main valve being operated by the pressure in said main.

18. In combination, a fluid main, sources of fluid pressure associated with said main, a main valve in said fluid main between two sources of pressure, said valve being normally closed, a path being provided around said valve for conducting the normal flow through said main, a meter in said path for measuring the flow of fluid therethrough, a valve governing said path controlled by said main valve, said valve being closed by said main valve as said main valve opens, a second path around said valve normally closed, a second valve in said second path being provided governing the flow therethrough controlled by said main valve and opened as said main valve is opened, the flow of fluid through said second path being proportional to the flow through the main valve, a proportional meter for measuring the flow through the second path, and pressure controlled means in said main adapted to govern the movements of the main valve, the influence exerted on said main valve by said pressure controlled means being decreased as the main valve opens.

19. In combination, a fluid main, sources of fluid pressure associated with said main, a main valve in said fluid main between two sources of pressure, said valve being normally closed, a path being provided around said valve for conducting the normal flow through said main, a meter in said path for measuring the flow of fluid therethrough, a valve governing said path controlled by said main valve, said valve being closed by said main valve as said main valve opens, a second path being provided around said valve normally closed, a second valve in said second path governing the flow therethrough controlled by said main valve and opened as said main valve is opened, the flow of fluid through said second path being proportional to the flow through the main valve, a proportional meter for measuring the flow through the second path, and a piston in said main adapted to be operated by the pressure thereon, a lever connecting said piston to said main valve, said main valve being controlled by said piston, the influence exerted upon said main valve by said piston being proportional to the distance of the main valve from its closed position.

20. In combination, a fluid main, a valve controlling the flow of fluid therethrough, said valve being subjected to pressures of different values on its two sides, a two sided device beyond said valve exposed on one of its sides to the pressure of the fluid in the main below the valve and to constant pressure on the other side, and means to connect said device to said valve.

21. In combination, a fluid main, a valve controlling the flow of fluid therethrough, said valve being subjected to pressures of different values on its two sides, a piston chamber, a piston in said chamber exposed on one side to the fluid pressure below said valve, and to constant pressure on the other side, and means to connect said piston to said valve.

22. In a device of the class described, the combination of a fluid main, a main valve therein controlling the flow of fluid therethrough, said main valve being operated by the fluid in the main, a by-pass provided for the flow of fluid around said main valve, a rotary valve controlling said by-pass governed by said main valve, the fluid flow through said by-pass being under the sole control of the main valve and being proportional to the flow through the main valve and means for measuring the fluid flow flowing through the by-pass.

23. In a device of the class described, the combination of a fluid main having an orifice therein, a main valve controlling said orifice, a path being provided for fluid around said orifice and a Corliss valve in said path controlled by said main valve.

24. In a device of the class described, the combination of a fluid main in which there is fluid under pressure, a main valve controlling the flow of fluid in said main, means creating a by-pass around said main valve apparatus controlling the flow of fluid through said by-pass governed by the main valve and a two-sided device, and means whereby it is exposed on one side to a constant pressure and on the other side to a pressure in the main, pressing said main valve toward a closed position.

25. In a device of the class described, the combination of a fluid main, a main valve in said main, means for conducting fluid through said main when said main valve is closed, and a rotary valve controlling said means, said rotary valve being governed by the main valve.

26. In a device of the class described, the combination of a fluid main, a main valve in said main, a plurality of means for conducting fluid around said main valve, meters in said means, and Corliss valve means controlling said first named means, said Corliss valve means being governed by said main valve.

27. In a device of the class described, the combination of a fluid main, means controlling the flow of fluid through said main consisting of a main valve and a Corliss valve controlled by the main valve.

28. In a device of the class described, the combination of a fluid main, means controlling the flow of fluid through said main consisting of a main valve and a Corliss valve controlled by the main valve, and means for measuring the flow of fluid through said main.

29. In a device of the class described, the combination of a fluid main, a main valve in said main, a normally open path being provided around said main valve, a direct reading meter in said path, a second and normally closed path being provided around said valve, a proportional meter in said second path, and a Corliss valve controlling said by-path and governed by said main valve.

30. In combination a fluid main, a valve controlling the flow through said main, a two-sided device exposed on one of its sides to the pressure of the fluid in said main and to a constant pressure on the other side, and means to connect said device to said valve.

31. In combination, a fluid main, a valve for said main, a piston chamber, a piston in said chamber, said piston being exposed on one of its sides to the fluid pressure, and on the other side to atmospheric pressure, and means to connect said piston to said valve.

32. In a device of the class described, the combination of a fluid main and a by-pass of said main, each adapted to conduct a fluid flow, means exercising exclusive control of the flow through the by-pass, and apparatus operated by the flow in the main independently of the flow in the by-pass governing said means to maintain the flows proportional.

33. In a device of the class described, the combination of a fluid main, a main valve, means subjected to variations in pressure in said main, influencing the operation of said main valve, a path being provided around said main valve, and a Corliss valve in said path controlled by said main valve.

34. In a hydraulic device of the class described, the combination of a water main, a path provided around a section of said main, a main valve in said section, and a valve in said path regulating the water flow therein, and means whereby the last named valve is controlled solely by said main valve, the main valve being operated by the flow in the main independently of the fluid flow in the path, to maintain the flows proportional.

35. In combination, a fluid main, a valve in said main, a piston chamber, a piston in said chamber exposed on one side to a variable pressure and on the other to a constant pressure, and means to connect said piston to said valve.

36. In combination, a fluid main, a valve in said main, a chamber, a movable member in said chamber subjected to a constant pressure on one side and to the pressure of the fluid in the main on the other, means to connect said movable member to said valve, and meters for indicating the quantity of flow of fluid through said main.

37. In combination, a fluid main, a valve in said main, a piston chamber, a piston therein exposed on one side to the pressure of the fluid in said main, and on the other side to atmospheric pressure, means to connect said piston to said main valve, a plurality of paths being provided around said main valve, meters in said paths, and valve means governed by said main valve for controlling said paths.

38. In a device of the class described, the combination of a fluid main, a main valve in said main, the opening and closing of said main valve being effected by the pressure of fluid in said main, means governing the movement of said main valve, said means being controlled by the pressure in said main, a path being provided around said valve, a meter in said path, and a valve in said path and means whereby it is controlled solely by said main valve.

39. In a device of the class described, the combination of a fluid main, a valve in said main adapted to be operated by the fluid in said main, and means to control the operation of said valve, the distance of said valve from its closed position being a function of the pressure difference and the absolute pressure in the main.

40. In a device of the class described, the combination of a fluid main, a by-pass around a section of said main through which fluid may flow, a valve exercising exclusive control of the flow through the by-pass, and a main valve in said section operated independently of the flow in the by-pass and means whereby the valve in the by-pass is controlled by said main valve, to maintain the flows proportional.

41. In a device of the character described, the combination of a fluid main, a by-pass around a section of said main through which fluid may flow, apparatus controlled by the flow through the by-pass, a valve exercising exclusive control of the flow through the by-pass, and a main valve in said section operated by the main flow independently of the flow in the by-pass, and means whereby said main valve controls said first named valve, to maintain the flows proportional.

42. In a device of the class described, the combination of a fluid main and means to cause a flow of fluid therein, a device controlling the flow of fluid through the main, means including said device to create from the flow in the main a flow of fluid functional to the flow in said main, a duct for the functional flow having an orifice therein, the functional flow being under the sole control of said device, means to control said orifice and apparatus actuated by the functional flow.

43. In a device of the class described, the combination of a fluid main, a by-path provided communicating with said main, a main valve in said main controlling the flow of fluid therethrough, a meter in said by-path, a second by-path communicating with said main, a proportional meter in said second by-path and means controlled by said main valve governing the flow through one of said paths.

44. In combination, a fluid main having an orifice therein, a main valve controlling the flow through said orifice, a plurality of by-paths communicating with the main, a direct reading meter in one of said paths and a proportional meter in another and valves controlled by said main valve governing the flow of fluid through said by-paths.

45. In a device of the class described, the combination of a fluid main, a main valve in said main governing the same, a plurality of by-passes to conduct fluid around the main valve, means controlled by the main valve for opening one of the said by-passes when the main valve is closed and for closing said by-pass when the main valve is opened and apparatus governed by the main valve, regulating the flow through a second by-pass to be proportional to the flow through the main.

In testimony whereof, we hereunto affix our signatures in the presence of two witnesses, this 6th day of July, 1911.

GEORGE GOODELL EARL.
ALBERT BALDWIN WOOD.

Witnesses:
E. G. CARROLL,
JOHN C. BARTLEY.